United States Patent [19]

Heise et al.

[11] 4,320,456

[45] Mar. 16, 1982

[54] CONTROL APPARATUS FOR VIRTUAL ADDRESS TRANSLATION UNIT

[75] Inventors: Nyles N. Heise, Rochester; Roy L. Hoffman, Pine Island; Istvan S. Kiss, Rochester; David O. Lewis, Rochester; James J. Pertzborn, Rochester; Thomas S. Robinson, Rochester, all of Minn.

[73] Assignee: International Business Machines Corporation, Armonk, N.Y.

[21] Appl. No.: 113,863

[22] Filed: Jan. 18, 1980

[51] Int. Cl.[3] .......................... G06F 3/00; G06F 9/36

[52] U.S. Cl. .......................... 364/200

[58] Field of Search ... 364/200 MS File, 900 MS File

[56] References Cited

U.S. PATENT DOCUMENTS

| | | | |
|---|---|---|---|
| 3,251,040 | 5/1966 | Burkholder et al. | 364/200 |
| 3,786,427 | 1/1974 | Schmidt et al. | 364/200 |
| 3,839,706 | 10/1974 | Borchsenius | 364/200 |
| 3,909,798 | 9/1975 | Wallach et al. | 364/200 |
| 4,060,849 | 11/1977 | Bienvenu et al. | 364/200 |
| 4,092,715 | 5/1978 | Scriver | 364/200 |
| 4,110,830 | 8/1978 | Krygowski | 364/200 |
| 4,115,854 | 9/1978 | Capowski et al. | 364/200 |
| 4,130,868 | 12/1978 | Heuer et al. | 364/200 |
| 4,155,119 | 5/1979 | De Ward et al. | 364/200 |
| 4,177,513 | 12/1979 | Hoffman et al. | 364/200 |
| 4,218,743 | 8/1980 | Hoffman et al. | 364/200 |
| 4,231,088 | 10/1980 | Hammer et al. | 364/200 |

*Primary Examiner*—Gareth D. Shaw

*Assistant Examiner*—Eddie P. Chan

*Attorney, Agent, or Firm*—Donald F. Voss

[57] ABSTRACT

Control apparatus is responsive to CPU I/O commands for initiating chained I/O data transfers to cause virtual address translation (VAT) apparatus to translate a first virtual address to be used in the chained data transfer operation and load the translated (resolved) address in an I/O resolved address register reserved (unique) to the commanded I/O device connected to a shared I/O control unit and to repeat such an operation for each I/O device commanded by the CPU to do a data transfer and responsive to a command from the shared control unit indicating that one of the commanded I/O devices is ready for data transfer to become nonresponsive to further CPU I/O commands and cause the VAT to resolve a succession of virtual addresses for the data transfer and to load the resolved addresses into I/O resolved address registers shared for use by all of I/O devices whereby a data transfer operation can commence using the resolved address in the register unique to the I/O device which is first ready for data transfer and thereafter continue with data transfers using resolved addresses from the registers shared by all of the I/O devices but captured for use by the I/O device first ready for data transfer. Upon the data transfers being completed for that I/O device, the VAT resolves a succession of virtual addresses and loads them into the shared registers for use during data transfers by the next ready I/O device in response to a command from the shared I/O control unit.

6 Claims, 10 Drawing Figures

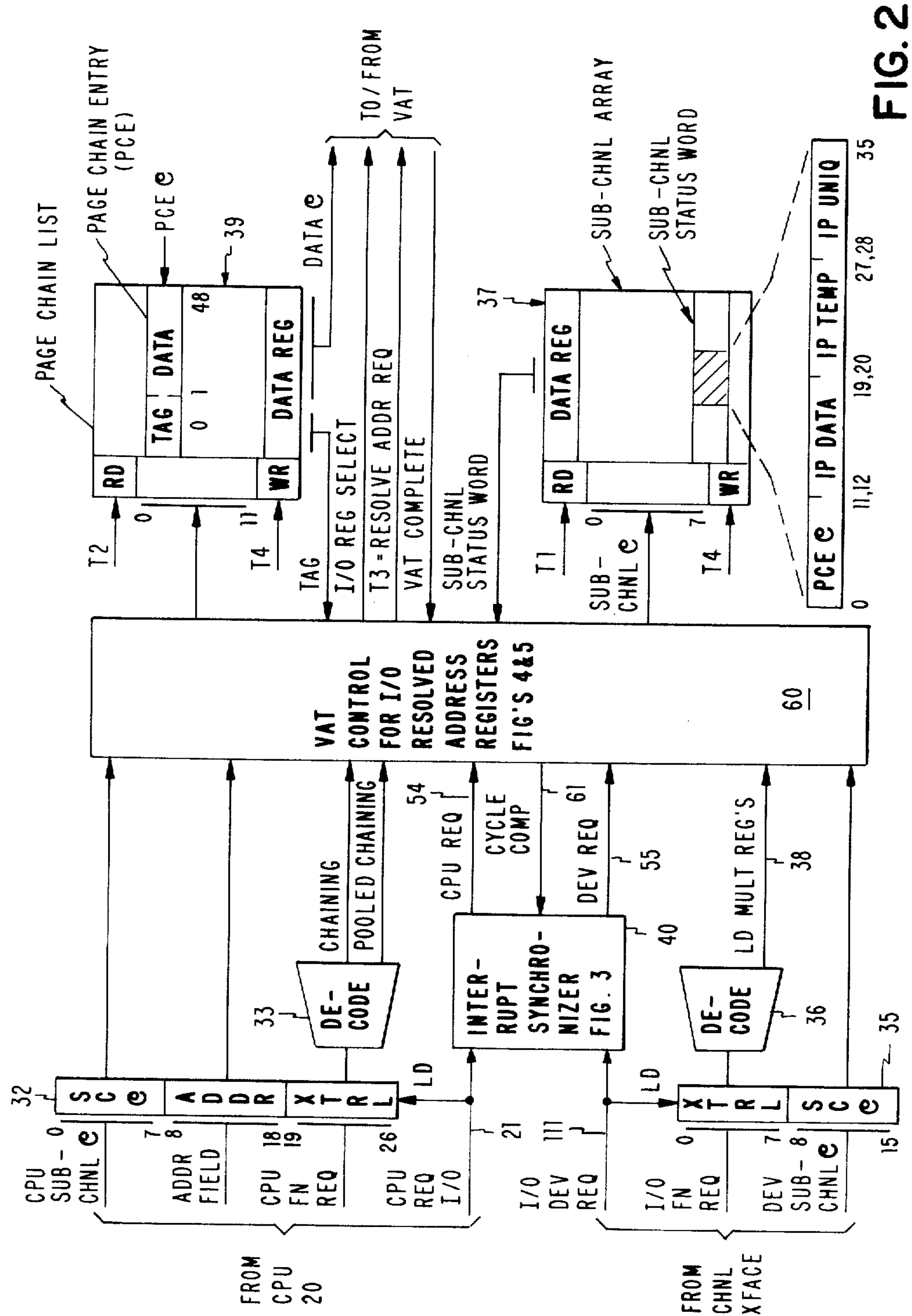
FIG. 2
PAGE CHAIN LIST
PAGE CHAIN ENTRY (PCE)
PCE ⓔ
39
TAG
DATA
DATA REG
RD
WR
T2
T4
DATA ⓔ
TO / FROM VAT
I/O REG SELECT
T3 = RESOLVE ADDR REQ
VAT COMPLETE
SUB-CHNL STATUS WORD
SUB-CHNL ARRAY
37
T1
SUB-CHNL ⓔ
PCE ⓔ
IP DATA
IP TEMP
IP UNIQ
VAT CONTROL FOR I/O RESOLVED ADDRESS REGISTERS FIG'S 4&5
60
CHAINING
POOLED CHAINING
DE-CODE
33
CPU REQ
54
CYCLE COMP
61
DEV REQ
55
INTER-RUPT SYNCHRO-NIZER FIG. 3
40
LD MULT REG'S
38
36
35
32
S C ⓔ
A D D R
X T R L
LD
CPU SUB-CHNL ⓔ
ADDR FIELD
CPU FN REQ
CPU REQ I/O
21
I/O DEV REQ
111
I/O FN REQ
DEV SUB-CHNL ⓔ
FROM CPU 20
FROM CHNL XFACE CPU REQ
54
DEV REQ
55
50
53
46
47
48
49
51
52
43
45
42
41
44
t1
t6
t2
t4
CPU REQ I/O
21
I/O DEV REQ
111
CYCLE COMPLETE
61
TRAP REQ
SYNC INTERRUPT
INTERRUPT OUT

CONTROL APPARATUS FOR VIRTUAL ADDRESS TRANSLATION UNIT

DESCRIPTION

This invention relates to computer systems having virtual storage and more particularly to such computer systems which include a plurality of I/O devices connected to a common or shared control unit.

The principal object of the invention is to reduce the number of I/O resolved address registers in the virtual address translation unit which normally would be required for chained data transfer operations by the I/O devices connected to the common control unit. Multiple I/O resolved address registers are required for the data transfer operation in some computer systems, particularly computer systems which dynamically allocate storage.

By having multiple I/O resolved address registers, the occurrence of an I/O device overrun is eliminated because the I/O device does not have to wait for address resolution to take place during data transfer. With a number of I/O devices connected to a common control, it becomes uneconomical to have multiple I/O resolved address registers dedicated for each I/O device. The present invention solves the problem by dedicating a single I/O resolved address register to each I/O device and providing multiple I/O resolved address registers to be shared by all of the I/O devices connected to the common control unit.

The shared registers are captured for use by the first I/O device ready to do a data transfer operation, even though it may not have been the first I/O device commanded by the central processing unit (CPU) to do a data transfer operation. The I/O resolved address register dedicated to an I/O device is loaded with a resolved address as the CPU commands that I/O device to do a data transfer. A number of dedicated I/O resolved address registers may be loaded before any commanded I/O device is ready to do a data transfer. However, once a commanded I/O device is ready to do a data transfer, the shared control unit issues a load multiple registers command which essentially captures use of the shared I/O resolved address registers for the I/O device ready for data transfer and locks out further I/O data transfer commands from the CPU so that there is no interference between resolving addresses for dedicated I/O resolved address registers and for the shared I/O resolved address registers in that the address resolution apparatus can be responsive to only one command at a time and commands can come simultaneously from the CPU and the shared I/O control unit.

BACKGROUND ART

Prior art approaches known to the present inventors include providing multiple I/O resolved address registers for each I/O device connected to the shared I/O control unit. Another known prior art approach is to make the address resolution apparatus so fast that multiple I/O resolved address registers are not necessary. The latter solution of course is not feasible, if the computer system architecture would not lend itself to such a change. In some instances the I/O shared control unit may be added to an existing computer system and it isn't feasible to restructure the address resolution apparatus as compared to the shared register approach of the present invention. Extensive data buffering could be used to avoid overrun but that would be relatively more expensive. Pre-allocation rather than dynamic allocation of storage also eliminates the problem but is not storage efficient. Pre-allocation reduces the address resolution burden during data transfers because storage space for the data transfer can be made contiguous whereas in dynamic allocation storage space is likely to be non-contiguous.

BRIEF DESCRIPTION OF THE DRAWINGS

FIG. 2 is a schematic diagram in block form illustrating the control apparatus of the present invention for synchronizing the CPU and I/O interrupts and for developing control signals for the VAT;

DISCLOSURE OF INVENTION

Figure 1:
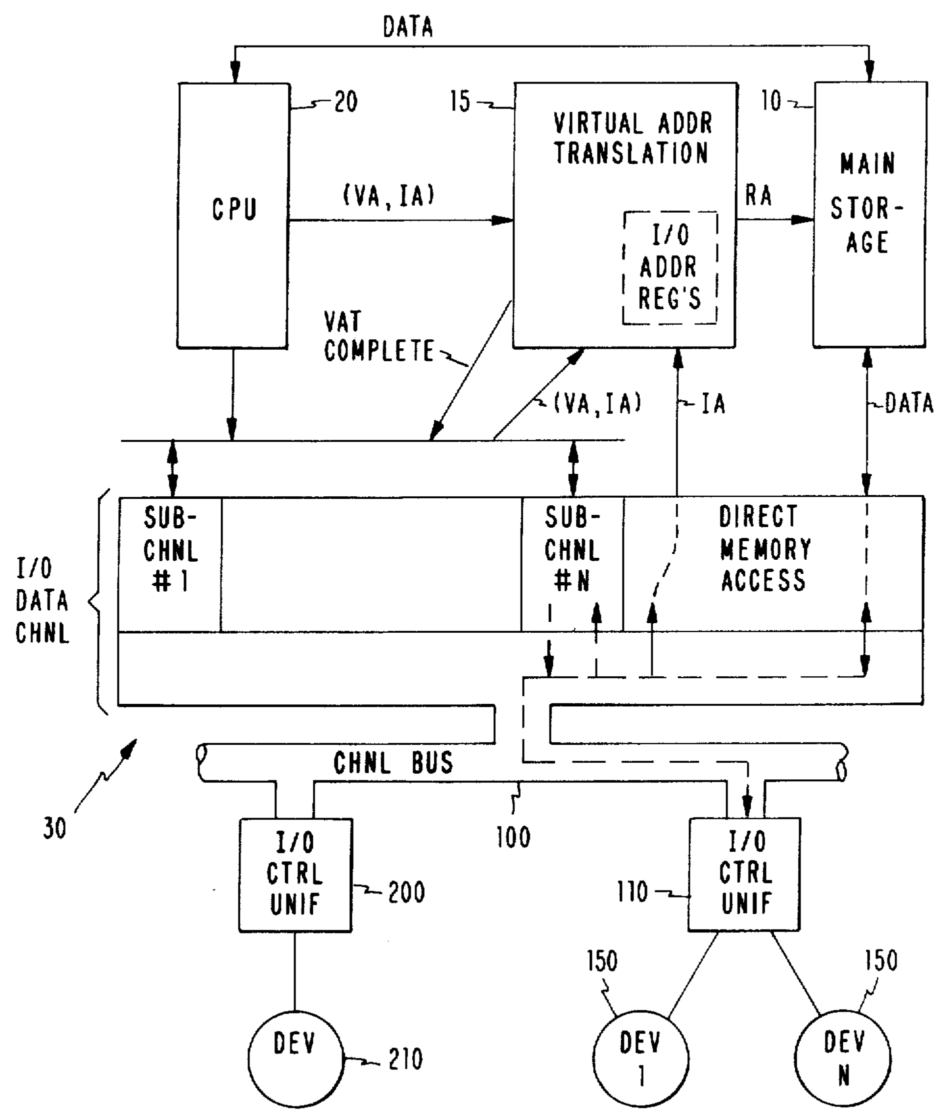
FIG. 1 is a schematic diagram in block form illustrating a computer system incorporating the present invention.

The present invention is incorporated in a computer system schematically illustrated in FIG. 1. The computer system of FIG. 1 is of the type shown in greater detail in U.S. Pat. No. 4,177,513 dated Dec. 4, 1979 for Task Handling Apparatus For A Computer System by Roy L. Hoffman, et al. which is incorporated herein by reference. The computer system of that patent; however, does not disclose the details of a virtual address translation (VAT) apparatus which is shown in U.S. Patent applications Ser. No. 925,490 filed July 17, 1978 for Address Translation Apparatus by Roy L. Hoffman, et al., now U.S. Pat. No. 4,218,743 and Ser. No. 953,656 filed Oct. 23, 1978 for Allocating and Resolving Next Virtual Pages For Inputs/Outputs by W. E. Hammer, et al now U.S. Pat. No. 4,231,088.

The computer system of FIG. 1 includes a main storage 10 which is addressed by real addresses supplied by virtual address translation (VAT) unit 15. Main storage 10 as set forth in the referenced application, Ser. No. 925,490, is organized into N page frames of storage locations. Pages are loaded into main storage 10 from a program's address space. Pages from a program's address space are identical in size to page frames in main storage 10. In a virtual storage system, the capacity of virtual storage exceeds the capacity of real storage and in this example, main storage 10. The virtual storage address is thus larger than the real storage address because it addresses a larger storage space. Consequently, it is necessary to translate the virtual storage address to a real storage address and this is accomplished by virtual address translation unit 15.

Virtual storage is generally divided into a number of segments and each segment is divided into pages of a fixed size. The virtual address has a segment identification (SID) portion, a page identification (PID) portion and a byte identification (BID) portion. The translated real storage address includes a real frame identifier (FID) portion and a byte identification (BID) portion where the BID portion of the real storage address is the same as the BID portion of the virtual storage address.

The program of the computer system consists of a series of instructions which are executed by central processing unit (CPU) 20. During execution of the instructions, the computer system can be required to do an input/output operation. For such an operation, the CPU 20 sends a command to I/O data channel 30. The I/O command can be, for example, a command for transferring data between main storage 10 and an I/O device. In this example, I/O devices 150 are connected to a shared I/O control unit 110 which in turn connects to channel bus 100. Other I/O devices, such as I/O device 210, connect to associated control units such as control unit 200 which are also connected to channel bus 100. Channel bus 100 interfaces with data channel 30.

Figure 1A:
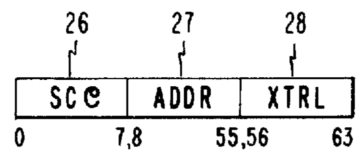
FIG. 1A is a diagram illustrating the format of an I/O command.

An I/O command issued by CPU 20 has a format as shown in FIG. 1A and includes a CPU subchannel address field 26, and address field 27 and a control field 28 which specifies the function required. When the CPU 20 sends a command to channel 30, it activates a tag or control line 21, FIG. 2, which carries a CPU REQ I/O signal to indicate to the channel that an I/O command has been sent to it. The CPU REQ I/O signal is used to load the fields of the I/O command into subchannel register 32 which in this example has a capacity of 27 bits. The subchannel address field consists of eight bits or one byte. The address in the I/O command is an address for addressing a page chain list array 39 and it consists of eleven bits. The control field consists of eight bits or a single byte.

A command can also come from a control unit such as shared control unit 110. A command from such a control unit includes a subchannel address field and a control field and in this particular example, each field consist of eight bits or one byte. The subchannel address field and the control field are loaded into register 35 under control of an I/O device request signal I/O DEV REQ on line 111 which is activated by the shared control unit 110. Because CPU 20 and shared control unit 110 could issue a command simultaneously, it is necessary to synchronize the two asynchronous requests. The synchronization is accomplished by interrupt synchronizer 40 which is shown in detail in FIG. 3.

The function of the interrupt synchronizer is to accept the request from the CPU 20 and the shared control unit 110 and synchronize the requests such that only one request will be sent and in proper sequence to VAT control for I/O resolve address registers block 60. The CPU REQ I/O signal on line 21 from CPU 20 is applied to the set input of latch 41, FIG. 3. The I/O DEV REQ signal on line 111 is applied to the set input of latch 44. The set outputs of latches 41 and 44 are applied to AND circuits 43 and 45 respectively. AND circuit 43 is conditioned by a t2 timing signal whereas AND circuit 45 is conditioned by a t4 timing signal. The timing signals t2 and t4 are generated from a timing ring 183 of FIG. 4 which will be described later herein.

AND circuits 43 and 45 are further conditioned by the output of AND circuit 42 which has inputs from the reset outputs of latches 46 and 47. Latches 46 and 47 are synchronizing latches whereas latches 41 and 44 are trapping latches for trapping the interrupt request. The timing signals t2 and t4 prioritize the trap request latches 41 and 44. Thus the CPU REQ I/O signal has priority over the I/O DEV REQ signal. In order for a trapped interrupt to pass from the interrupt synchronizer 40, latches 46 and 47 must both be in the reset state. When this condition exists, AND circuit 42 conditions AND circuits 43 and 45.

If there is a CPU REQ I/O signal for setting latch 41 and latches 46 and 47 are both in the reset state, then AND circuit 43 will pass a signal at t2 time to set latch 46. With latch 46 set, AND circuit 42 is no longer conditioned and even though an I/O DEV REQ signal on line 111 sets latch 44, the set output of that latch will not be passed by AND circuit 45 to set latch 47. The set output of latch 46 is applied to the reset input of latch 41 to reset it and is applied to AND circuit 48 which is conditioned by a t1 timing signal. The output of AND circuit 48 is applied to the set input of latch 50 which passes a CPU REQ signal from its set output on line 54.

If a CPU REQ I/O signal has not been applied to line 21 to set latch 41 by t2 time, then if latch 44 has been set by the I/O DEV REQ signal on line 111 before t4 time, AND circuit 45 will pass a signal for setting latch 47 provided both latches 46 and 47 are in the reset state. The set output of latch 47 is applied to the reset input of latch 44 and to an input of AND circuit 51. AND circuit 51 is conditioned by a t1 timing signal and its output is applied to the set input of latch 53. The set output of latch 53 provides a DEV REQ signal on line 55.

Latches 46 and 47 maintain their set state until a Cycle Complete signal is returned from block 60 on line 61. The Cycle Complete signal is an indication from block 60 that the operation requested has been completed. Hence, when latches 46 and 47 are both reset by the Cycle Complete signal on line 61, a trap interrupt request signal by either latches 41 or 44 can be honored at the appropriate time. The interrupt out latches 50 and 53 are reset, after latches 46 and 47 have been reset, at t6 time via AND circuits 49 and 52 respectively.

The timing signals t1–t6 inclusive are from a free running circular timing ring 183. Timing ring 183 is advanced by a clock pulse applied to AND circuit 182 which is conditioned by the reset output of latch 181. Hence, although the timing ring 183 is free running it can be stopped whenever latch 181 is set. Latch 181 is set by a T5 timing pulse and is reset via OR circuit 180 by a start signal or by a VAT Complete signal. The T5 timing signal is a gated timing signal. The gating of the timing signals t1–t6 is for the purpose of providing greater control within VAT control 60. The outputs of timing ring 183 are applied to AND circuits 184 which are conditioned by the output of OR circuit 185. OR circuit 185 receives the CPU REQ signal on line 54 and the DEV REQ signal on line 55. The gated timing signals T1–T6 are taken from AND circuits 184. By setting latch 181 with the T5 timing signal so as to stop timing ring 183 and resetting latch 181 with the VAT Complete signal so as to again start timing ring 183, the time it takes for the VAT 15 to translate a virtual address is accommodated. The VAT Complete signal indicates that the address resolution cycle can terminate or recycle for the purpose of effecting another address resolution.

Although the CPU REQ I/O signal and I/O DEV REQ signals are synchronized as pointed out above, it should be noted that for I/O data transfer operations the CPU REQ I/O signal is generated first and thereafter an I/O DEV REQ signal can be generated by the control unit controlling the commanded I/O device. It should also be noted that the CPU could issue several I/O commands before any commanded I/O device is ready to do a data transfer.

In this particular example, there is a unique or dedicated I/O resolved address register for each I/O device. The resolved address registers are located in VAT 15 of FIG. 1 and correspond to the I/O registers 6 shown in FIG. 3 of U.S. Pat. No. 4,231,088 referenced earlier herein. Additionally, it should be noted that VAT 15 has a pool or group of I/O resolved I/O registers which are shared by all of the I/O devices 150 connected to the shared control unit 110. The shared I/O resolved address registers are captured for use by the first I/O device 150 ready to do a data transfer operation even though it may not have been the first I/O device commanded by CPU 20.

Figure 4:
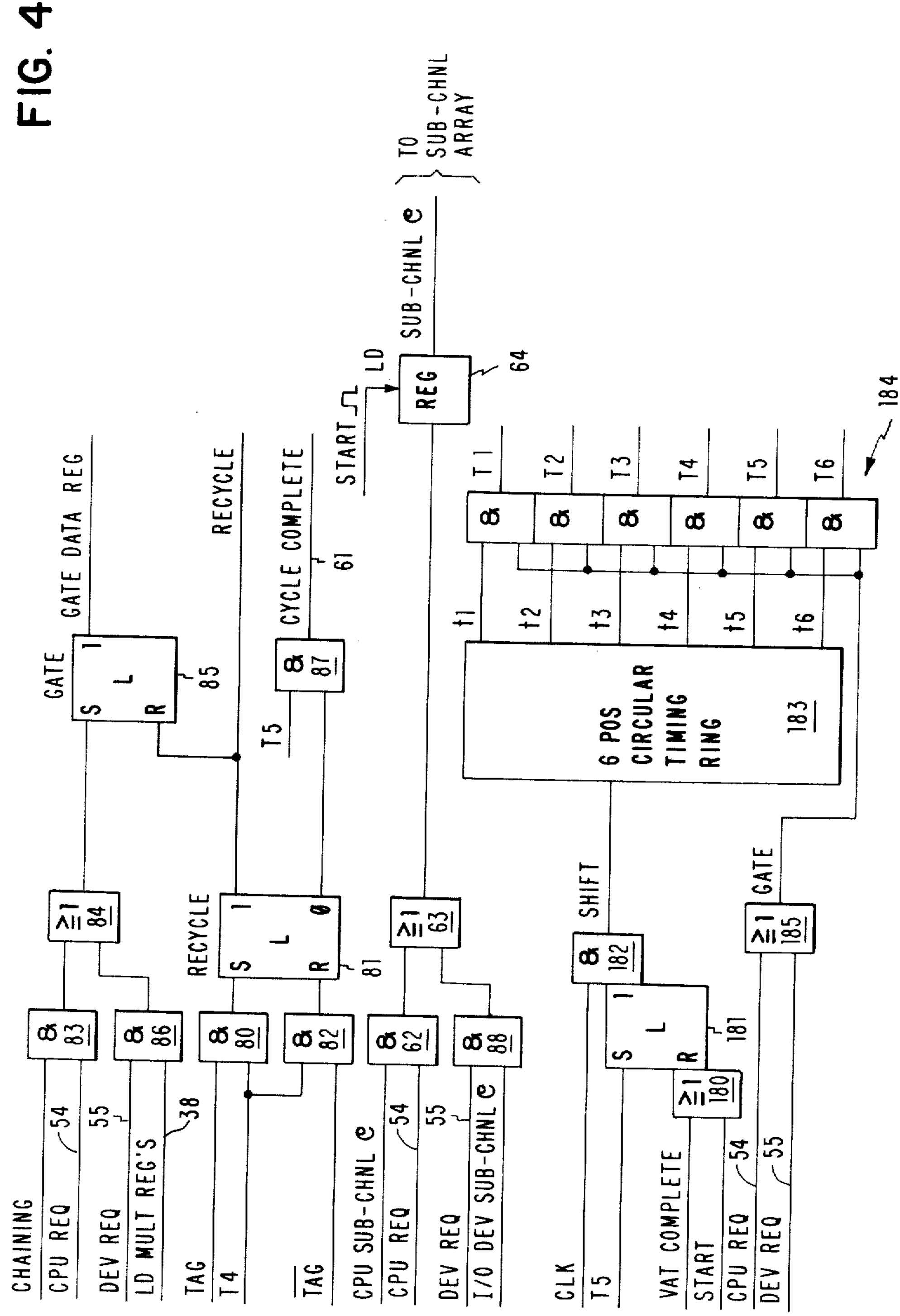
FIG. 4 is a logic circuit diagram of a portion of the VAT control for the I/O resolved address registers and includes a timing generator for the VAT control and interrupt synchronizer.

The CPU subchannel address field in register 32 is applied to an input of AND circuit 62, FIG. 4 which is conditioned by the CPU REQ signal on line 54. The eight bit subchannel address passed by AND circuit 62 when conditioned by the CPU REQ signal from latch 50 is set into register 64 via OR circuit 63 under control of a start signal. The subchannel address in register 64 addresses a subchannel status word in subchannel array 37. It should be noted that subchannel array 37 could be a discrete array as shown or it could be located in main storage 10. If subchannel status words were located in main storage 10, then the subchannel address would have to correspond to the real address for addressing main storage 10. In this particular example, the subchannel address is an eight bit address which provides a capacity for addressing 256 subchannel status words.

The subchannel status word normally includes data which is not pertinent to the present invention. Consequently, the fields of the subchannel status word pertinent to the present invention are shown in exploded form as including a page chain list address (PCE@), bits 0–11; a indirect pointer data field (IP-DATA), bits 12–19 inclusive; an indirect pointer temporary field (IP-TEMP), bits 20–27 inclusive and an indirect point unique field (IP-UNIQ), bits 28–35 inclusive. Subchannel array 37, FIG. 2, is read under control of a gated T1 timing signal and written with a gated T4 timing signal.

Figure 5:
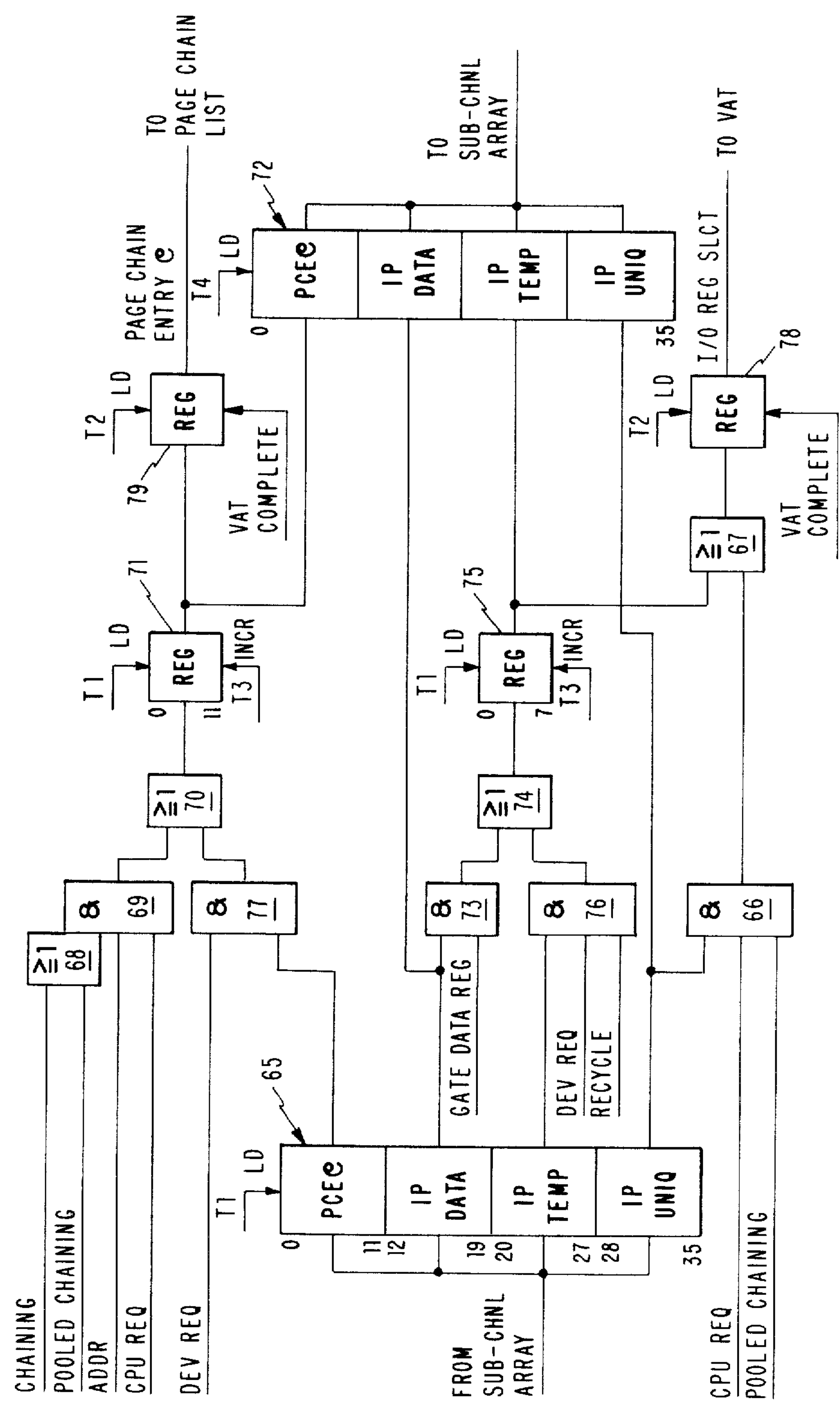
FIG. 5 is a logic circuit diagram showing additional VAT control circuitry.

The subchannel status word read from subchannel array 37 at T1 time is loaded into register 65, FIG. 5, during that same T1 time. The fields of the subchannel status word loaded into register 65 are applied to AND circuits which require conditioning. The only AND circuit which would be conditioned at this time, provided there were a Pooled Chaining signal as a result of decode 33 decoding the control field in register 32 is AND circuit 66. The pooled chaining signal together with the CPU REQ signal are applied to AND circuit 66 which receives the IP-Unique field from register 65. AND circuit 66 passes the IP-Unique field via OR circuit 67 into register 78 as an I/O register select (I/O REG SELECT) address which is applied to VAT 15 to select the unique resolved register dedicated to the commanded I/O device 150. Register 78 is loaded by a T2 signal and reset by a VAT complete signal.

The selected I/O resolved address register is loaded with a resolved address resulting from translation of a virtual data address containined in an entry in page chain list array 39, FIG. 2. Page chain list array 39 is similar to subchannel array 37 and the entries therein could be contained in main storage 10 instead of being in a separate array. Page chain list array 39 is addressed by a page chain entry address which, in this instance, will be an address from the address field in register 32, FIG. 2. That address field is applied to AND circuit 69, FIG. 5, which is conditioned by the CPU REQ signal and by a signal passed by OR circuit 68. OR circuit 68 has inputs connected to decode 33, FIG. 2, for receiving the Chaining signal or the pooled chaining signal. The output of AND circuit 69, FIG. 5, is set into register 71 at T1 time via OR circuit 70. The address in register 71 is transferred into register 79 at T2 time and addresses page chain list array 39. Register 79 is reset by the VAT Complete signal which occurs after the addressed entry is read from array 39 at T2 time. The page chain entry read from page chain list array 39 contains a tag bit and a 48-bit or six byte data address which is a virtual address to be translated by VAT 15 and loaded in the resolved I/O address register selected by the IP-Unique address. After the VAT 15 translates the virtual address to a real storage address, it generates a VAT Complete signal. The VAT complete signal, although not shown in the referenced application Ser. No. 925,490 results when there is an equal compare from compare 65 in FIGS. 1–2 of the referenced application and there is a not start signal. This would be detected by an AND circuit which has an input from inverter 59 and an input from compare 65.

The output of register 71, FIG. 5, is also applied to register 72 which is loaded under control of a gated T4 signal. Register 71, however, is incremented by one at gated T3 time. Thus, an incremented page chain entry address PCE@ is loaded into register 72 at T4 time together with indirect pointer data IP-DATA and indirect pointer unique IP-Unique from register 65. The contents of register 72 are written into subchannel array 37 at gated T4 time at the location addressed by the subchannel address in register 64. It should be noted that the indirect pointer temporary (IP-Temp) field in register 65 does not enter directly into register 72. The indirect pointer temporary field in register 65 is applied to AND circuit 76 which is conditioned only if the DEV REQ signal is present together with a Recycle signal. The Recycle signal is used to indicate that another address resolution cycle is to take place.

The Recycle signal comes from the set output of recycle latch 81, FIG. 4. Recycle latch 81 is set via AND circuit 80 which is conditioned at gated T4 time only if the tag bit from the addressed page chain entry read from page chain list array 39 is set. Otherwise, recycle latch 81 is reset via AND circuit 82 which is conditioned by the gated T4 timing signal when the tag bit from the page chain entry read from page chain list array 39 is zero. The reset output of recycle latch 81 is applied to AND circuit 87 which is conditioned by a gated T5 timing signal. The output of AND circuit 87 is the Cycle Complete signal on line 61 to indicate that the cycle resulting from the I/O command issued by the CPU is complete.

Even though the entry in the page chain list array 39 contained a tag bit which would cause recycle latch 81 to be set, AND circuit 76 would not be conditioned to pass the indirect pointer temporary field unless the DEV REQ signal were present. The indirect pointer temporary field of register 65 when passed by AND circuit 76, is loaded into register 75 via OR circuit 74 at T1 time. The output of register 75 is applied to OR circuit 67 as well as to register 72. Register 75 is incremented by one at gated T3 time. Hence, the incremented value in register 75 is the value loaded into register 72 at gated T4 time.

The indirect pointer temporary field of register 75 can also be loaded with the indirect pointer data field from register 65 via AND circuit 73 and OR circuit 74 when AND circuit 73 is conditioned by a Gate Data REG signal. The Gate Data REG signal comes from latch 85, FIG. 4, which has its set input connected to the output of OR circuit 84 and its reset input connected to the set output of recycle latch 81. OR circuit 84 is fed by AND circuits 83 and 86. AND circuit 83 has an input from decode 33 for receiving a Chaining signal and an input from latch 50 to receive the CPU REQ signal. AND circuit 86 has an input connected to the output of decode circuit 36 for receiving the LD MULT REGS signal and an input connected to the set output of latch 53 for receiving the DEV REQ signal.

The DEV REQ signal, of course, is only present when an I/O device control unit sends an I/O DEV REQ signal on line 111, FIG. 2. When that occurs, the control field fed into register 35 is decoded by decode 36. Shared control unit 110, FIG. 1, can send a control field to register 35 which would cause decode 36 to generate a LD MULT REGS signal on line 38. The I/O control unit would also send a device subchannel address which is loaded into register 35, FIG. 2. The subchannel address is applied to AND circuit 88, FIG. 4., which is conditioned by the DEV REQ signal. This address, passed by AND circuit 88, is set into register 64 via OR circuit 63. This enables subchannel array 37 to be addressed when the command comes from the I/O control unit in the same manner as when the command comes from the CPU 20.

The fields from the subchannel status word read from subchannel array 37 at T1 time are entered into register 63 at that T1 time. Because the DEV REQ signal is present as a result of the I/O DEV REQ signal and assuming that the control field in register 35 is such that decode 36 develops a LD MULT REGS signal on line 38, AND circuit 86 is conditioned so as to set gate latch 85 via OR circuit 84. Thus the Gate Data REG signal is present for conditioning AND circuit 73, FIG. 5, whereby the indirect pointer data field from register 65 is loaded into register 75 via OR circuit 74 at this same gated T1 time. The contents of register 75 will be passed by OR circuit 67 as an I/O REG select address into register 78 at T2 time so as to be made available to VAT 15 to specify the I/O resolved address register to be loaded with a translated address. It should be noted that the indirect pointer unique field in register 65 is not passed by AND circuit 66 to select the resolved I/O address register in VAT 15. The I/O resolved address register specified by the address in register 78 at this time is the first I/O resolved address register of the pool of I/O resolved address registers shared by the I/O devices 150, FIG. 1, connected to shared control unit 110.

The address loaded into the selected I/O resolved I/O address register results from translating a virtual data address in a page chain entry selected by the page chain entry address loaded into register 71, FIG. 5, from register 65 via AND circuit 77 and OR circuit 70. AND circuit 77 is conditioned by the DEV REQ signal. The contents of register 71 are loaded into register 79 to be available to address the page chain list array 39 and the virtual data address from the selected entry read from array 39 is transmitted to the VAT 15 for translation to a real storage address and the translated address is loaded into the selected resolved I/O address register.

If the tag bit of the entry read from page chain list array 39, FIG. 2, is one, then at T4 time recycle latch 81, FIG. 4, is set whereby gate latch 85 is reset and AND circuit 76, FIG. 5, is conditioned to set the indirect pointer temporary field into register 75 via OR circuit 74. It should be noted that the indirect pointer data field which had been in register 75 was incremented at gated T3 time and entered into register 72 at T4 time. The contents of register 72 were then written into subchannel array 37 during that T4 time. Thus the entry read from subchannel array 37 at T1 time has an indirect pointer temporary field which is an incremented or updated indirect pointer data field. The new value in register 75 is passed by OR circuit 67 into register 78, which was reset with the VAT complete signal, as the I/O REG select address for VAT 15 to select the next I/O resolved address register of the shared I/O resolved address registers in VAT 15. The operation just described repeats so long as the tag bit of the selected page chain entry is a one.

Figure 3:
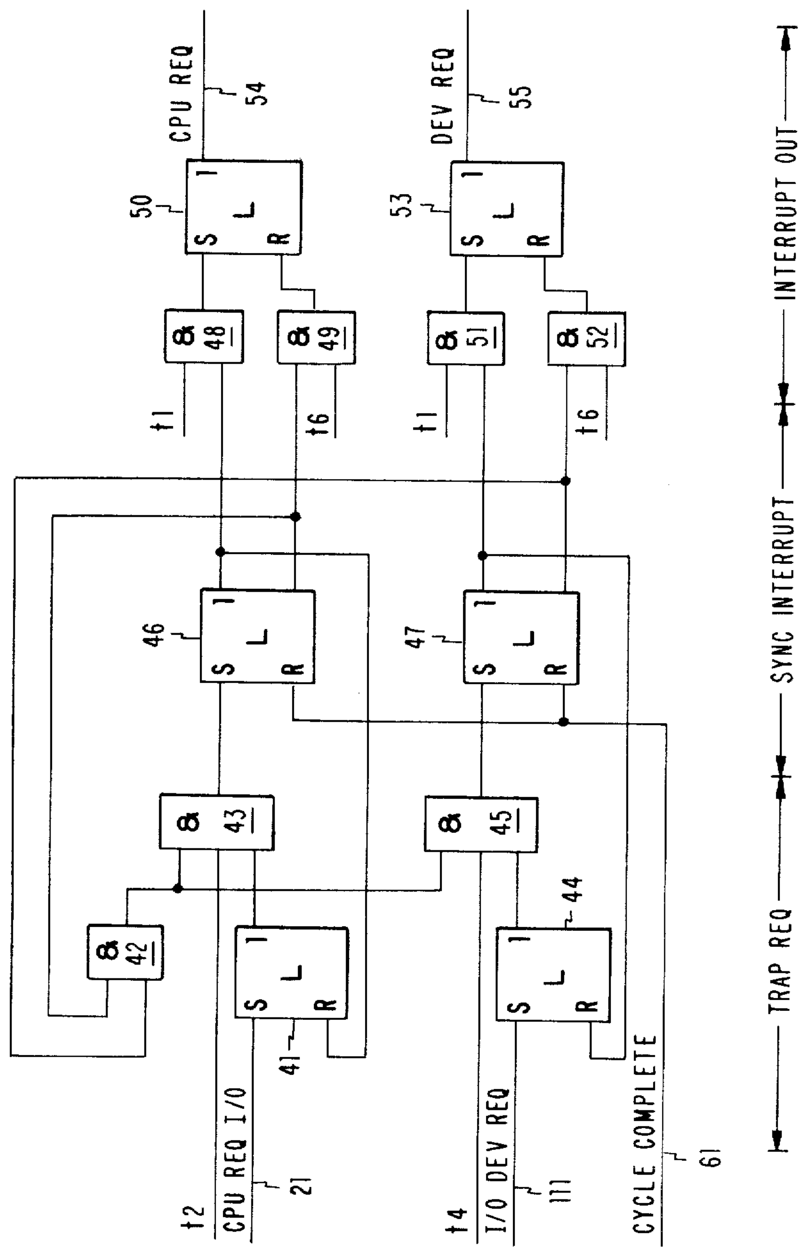
FIG. 3 is a logic diagram of the interrupt synchronizer.

Latches 46 and 47, FIG. 3, are reset by the Cycle Complete signal on line 61. The Cycle Complete signal, of course, can only be generated when recycle latch 81 is in the reset state and this will occur only when the tag bit from the page chain entry is zero.

Figure 6:
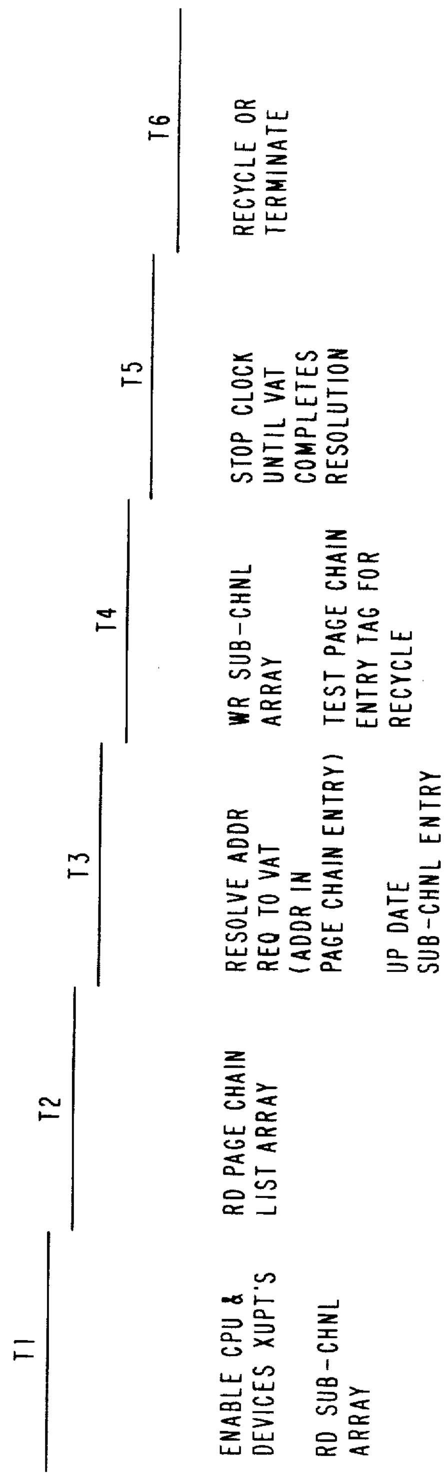
FIG. 6 is a timing diagram illustrating the functions taking place at particular times during a cycle.

The operation described is illustrated by the timing diagram of FIG. 6 wherein it is seen that at T1 time CPU and I/O device interrupts are enabled as well as the reading of the subchannel array 37. At T2 time, the page chain list array 39 is read. The VAT 15 is requested at T3 time to resolve or translate a virtual address from the selected page chain entry. Also at T3 time, the subchannel status word is updated as well as the address for the page chain list array 39. At T4 time, the subchannel array 37 is written and the tag bit of the page chain entry is tested to determine if a recycle operation is required. Timing ring 183 stops at T5 time and remains stopped until VAT 15 completes the translation of the virtual address supplied by the page chain entry. When the VAT Complete signal is generated by VAT 15 timing ring 183 can continue running to generate t6 time. At T6 time a recycle operation is permitted or the current cycle is terminated.

The operation illustrated by the timing diagram in FIG. 6 is for single cycle. At the end of such a cycle and assuming that the recycle latch 81 had not been set, the latches 46 and 47 of interrupt synchronizer 40 would be in the reset state due to the Cycle Complete signal on line 61. Additional I/O commands from either the CPU 20 or the shared control unit 110 could be honored by the interrupt synchronizer 40. The shared control unit 110 issues an I/O command when one of the commanded I/O devices 150, and in this example a disk storage drive, reaches a rotational position sense (RPS) position, FIG. 8, which is one millisecond away from where data is to be read or written on disk media 151.

Figure 7:
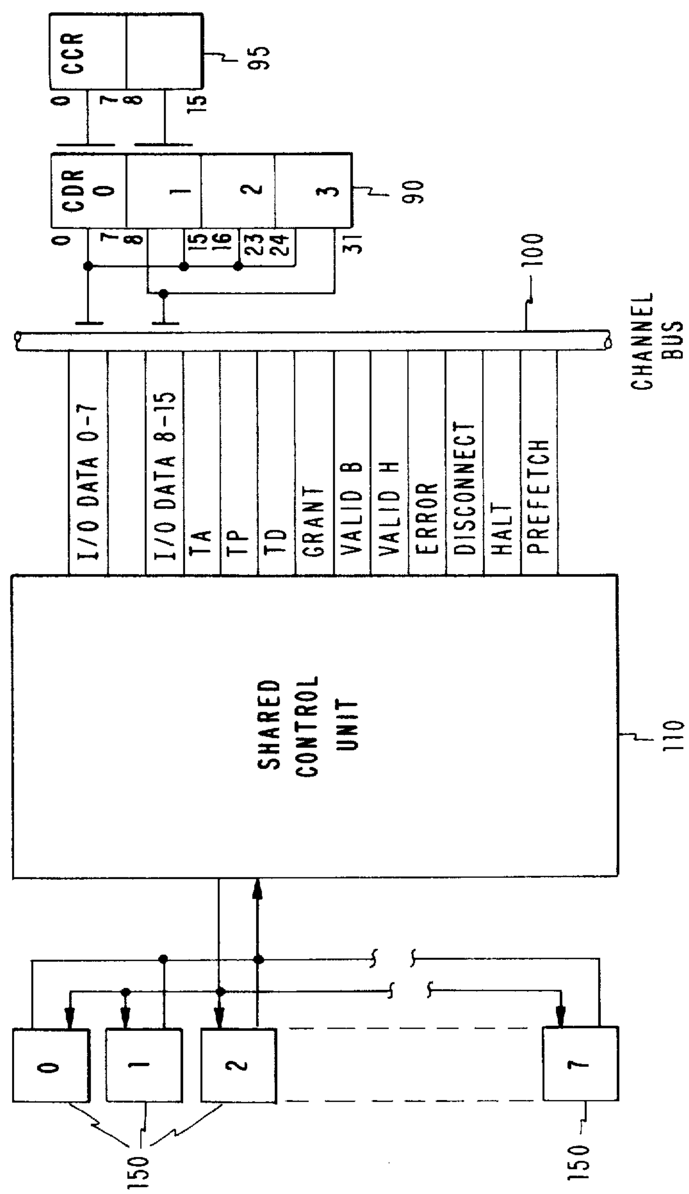
FIG. 7 is a schematic block diagram illustrating the interface between the shared control unit and the channel bus.

The shared control unit 110 for controlling I/O devices 150, FIG. 7, interfaces with channel 30 via channel bus 100 in the same manner that the I/O adapter shown in FIG. 1C of referenced application Ser. No. 953,656 interfaces with the channel. The I/O data bus in FIG. 7 of this application, however, is shown as an I/O data bus for bits 0-7 and an I/O data bus for bits 8-15 and this corresponds to the showing in FIG. 2B of the referenced application Ser. No. 953,656. The channel data register 90 in FIG. 7 corresponds to the channel data register 50 in FIG. 2B of referenced application Ser. No. 953,656. Channel control register 95 in FIG. 7 corresponds to channel control register 56 in FIG. 2A of referenced application Ser. No. 953,656. The channel data register 90 and channel control register 95 in FIG. 7 function in the same manner as the corresponding registers 50 and 56 in the referenced application Ser. No. 953,656.

Figure 8:
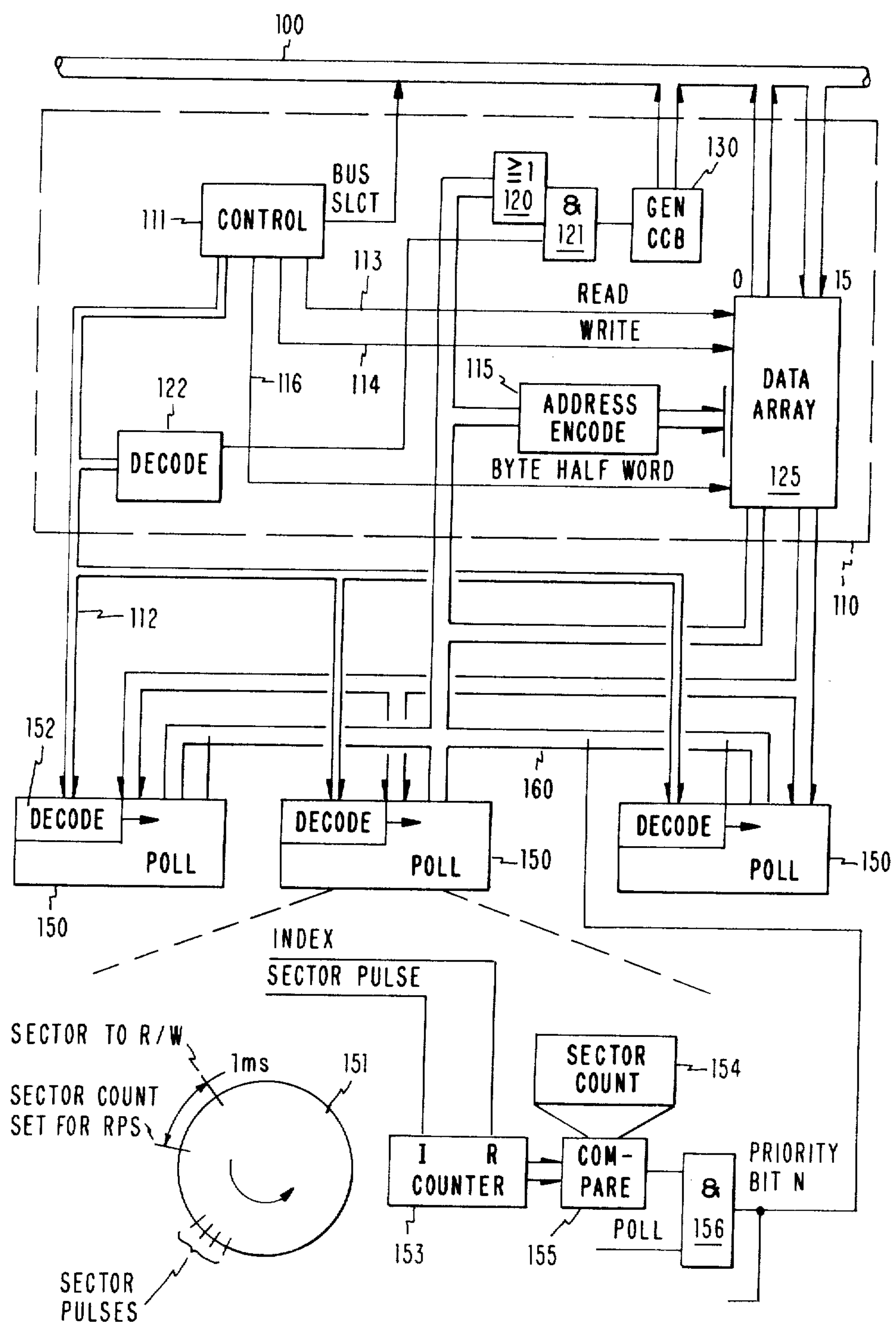
FIG. 8 is a schematic diagram illustrating details of the shared control unit and the attached I/O devices; and, FIG. 9 is a flow diagram illustrating the operation of the present invention.

Shared control unit 110, in this particular example, functions to control eight I/O disk storage drives 150, FIG. 8. The disk storage drives in this particular instance indicates that it is ready to transfer data one millisecond before the location to be read or written on the disk media is in position relative to the read/write transducers. Thus VAT 15 has approximately one millisecond to resolve the virtual addresses to be used for the data transfer operation. After one or more of the I/O devices 150 have been commanded by the CPU 20 to perform a data transfer operation, shared control unit 110 polls the I/O devices 150 by having control unit 111 activate 5-bit tag bus 112 to determine if any of the I/O devices commanded to do a data transfer operation have reached a RPS position.

The bit pattern on tag bus 112 is decoded by decode circuits 152 in the I/O devices 150. If a poll signal results from the decode, AND circuit 156 is conditioned to pass a compare signal as a priority signal on a preassigned bit line of Data Bus In 160. Data Bus In 160 is an eight bit bus plus parity and thus can handle at least eight priority bits from the eight I/O devices 150.

Compare 155 functions to compare a predetermined sector count in register 154 with an accumulated sector count in counter 153. Counter 153 is counting sector pulses which are generated by the commanded disk storage drive. Because several disk storage drives 150 could have been commanded by the CPU 20 to do a read or a write operation, shared control unit 110 includes a priority determining circuit effected by address encode 115 for resolving contention by two or more disk storage drives which have a compare signal generated by their compare unit 155.

Bus 160 feeds address encode 115 and OR circuit 120. Address encode 115 addresses data array 125 which is read and written in response to control signals from control 111. Additionally, data array 125 can transfer data on a byte or half-word basis depending upon a signal from control 111. For a data transfer operation, the device subchannel address which is placed on channel bus 100 comes from data array 125 as it is addressed by address encode 115 when control 111 provides a read signal on line 113. In this instance, control 111 also provides a signal on line 116 to cause a byte operation for data array 125 whereby the device subchannel address is placed as a byte on bus 100.

Channel bus 110 is 16-bits or 2-bytes wide and can transmit a byte or half-word depending upon the mode of operation. The subchannel address is placed on channel bus 100 in the manner that the channel control field (CCF) is placed on the I/O bus in referenced application Ser. No. 953,656 and particularly as shown in FIG. 5 of that referenced application. It should be noted that the subchannel address is entered into channel data register 90, FIG. 7, after the channel control byte (CCB) has been generated and placed on channel bus 100. The channel control byte (CCB) is generated by generator 130, FIG. 8, if OR circuit 120 detects a bit on bus 160 during a poll operation. The output of OR circuit 120 is applied to AND circuit 121 which is conditioned by the output of decode 122 which is fed by tag bus 112. The channel control byte indicates the I/O function that is required and as indicated in the foregoing description, it results in a decode of the LD MULT REGS signal on line 38 of FIG. 2. The channel control byte developed by generator 130 is transferred by channel bus 100 into channel data register 90, FIG. 7. Bytes 0 and 1 of channel data register 90 are then transferred into channel control register 95, FIG. 7, which in actuality is the same as register 35 of FIG. 2.

Figure 9:
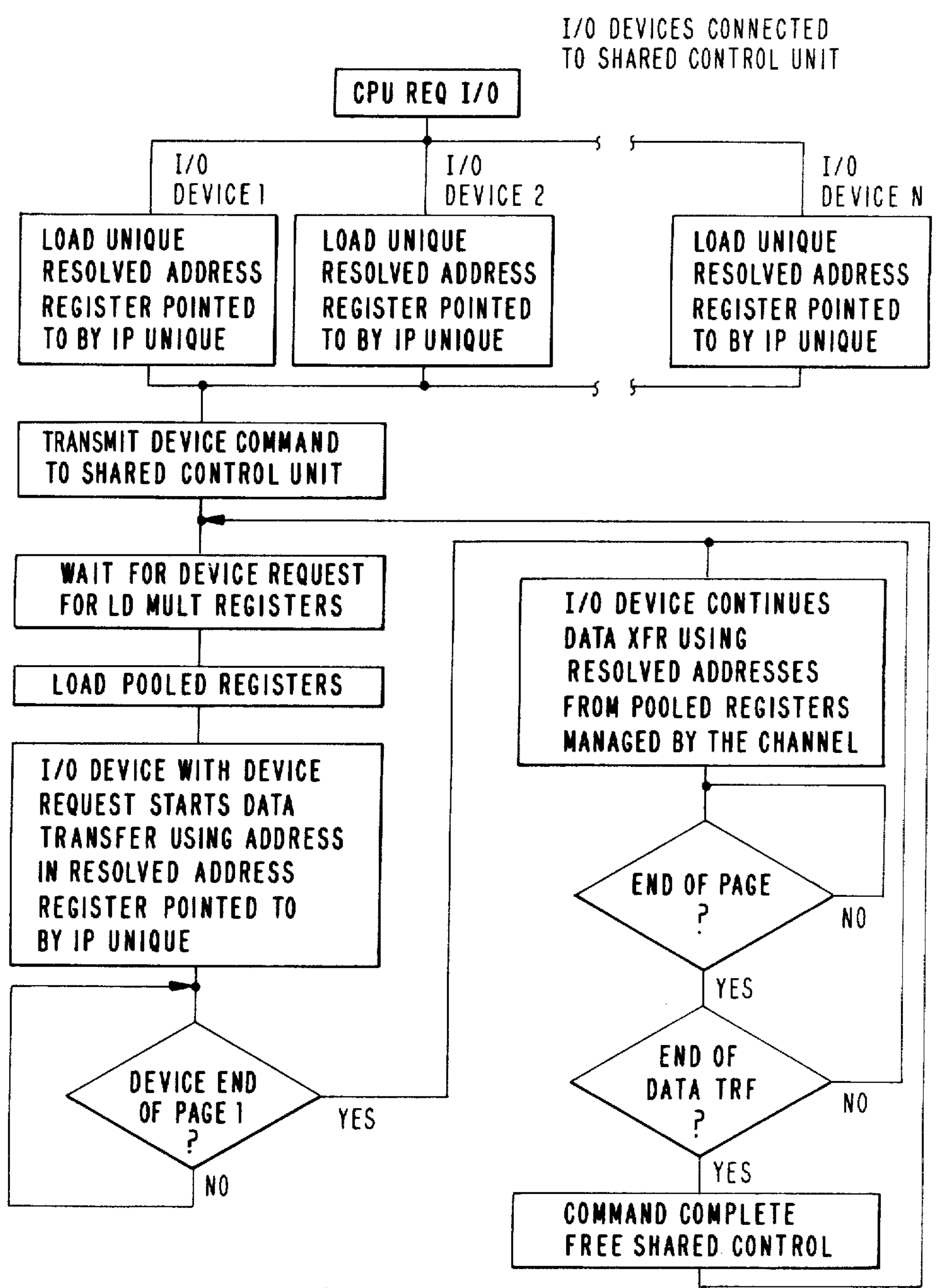

From the foregoing, and as illustrated in FIG. 9 it is seen that CPU 20 sends a request for an I/O operation to I/O devices 150 connected to shared control unit 110. The control apparatus of the present invention causes the VAT to load a unique or dedicated resolve address register for each command I/O device connected to the shared control unit 110. The command for the commanded I/O device is then transmitted to the shared control unit 110 which then commands the I/O device to perform the requested function. The control apparatus of the present invention then waits for one of the commanded I/O devices to transmit a command for loading multiple resolved address registers. This command results in the development of control signals which are sent to the VAT 15 for loading a pool of registers shared by all of the I/O devices 150 connected to the shared control unit. The I/O device which generated the command for load multiple registers, then starts a data transfer using the address in the resolved address register pointed to by indirect pointer unique. When and end of a page in main storage 10 is reached, data transfer continues but now using resolved addresses from the pool of registers. This action continues until the data transfer for that particular I/O device is complete.

It is also seen from the foregoing that the invention reduces the number of I/O resolved address registers in the virtual address translation unit which normally would be required for chained data transfer operations by the I/O devices connected to the shared control unit. It should also be appreciated that the address resolution is more efficient because multiple I/O resolved address registers are loaded with one event, i.e., one command, from the shared control unit rather that loading the resolved address registers as each page crossing takes place.

While the preferred embodiment of the invention has been illustrated and described, it is to be understood that the invention is not to be limited to the precise construction herein disclosed and the right is reserved to all changes and modification coming within the scope of the invention as defined in the appended claims.

Having thus described the invention, what is claimed as new, and desired secured by Letters Patent is:

1. In a virtual storage computer system having a real main storage, central processing unit (CPU), a virtual address translation (VAT) means for translating virtual storage addresses to real main storage addresses and including means for generating a translation complete signal upon completion of a translation, Input/Output (I/O) channel, and at least one I/O control means connected to control a plurality of I/O devices where said CPU and channel connect with said VAT and said real main storage, and said channel connects with said CPU and said one I/O control means, said channel being operable to transfer I/O commands from said CPU to said one I/O control means to command said plurality of I/O devices to perform data transfers to and from said main storage, said I/O commands being issued by said CPU in one sequence and said commanded plurality of I/O devices transferring data in a sequence dependent upon the order in which said commanded plurality of I/O devices are ready to transfer data, each of said plurality of I/O devices having a variable period of time from the time being commanded to the time of being ready for a data transfer, the improvement comprising:

a dedicated I/O address register in said VAT for each I/O device connected to said one I/O control means for storing a real main storage address corresponding to a virtual storage address translated by said VAT where said virtual address is transmitted to said VAT in response to a CPU request, a plurality of shared I/O address registers in said VAT for storing real main storage addresses corresponding to virtual addresses translated by said VAT where said virtual addresses are transmitted to said VAT in response to an I/O device request, and control means connected to said VAT and connected to receive CPU I/O command signals from said CPU and I/O device command signals from said one I/O control means and responsive to one of said CPU I/O command signals for generating said CPU request signal for said VAT in the absence of one of said I/O device command signals from said one I/O control means and for selecting the dedicated I/O address register corresponding to the I/O device being commanded by said one of said CPU I/O command signals to receive the real main storage address translated from the virtual storage address transmitted to said VAT in response to said CPU request signal and responsive to one of said I/O device command signals for generating at least a first I/O device request signal and transmitting it to said VAT and for generating a series of I/O device request signals and transmitting them to said VAT when said one of said I/O device command signals is for loading said plurality of shared I/O address registers, whereby said I/O dedicated registers are loaded with real main storage addresses for each CPU I/O command signal and said shared I/O address registers are loaded with real main storage addresses in response to I/O device request signals which were generated as a result of the first I/O device becoming ready for the data transfer.

2. In a virtual storage computer system having an addressable main storage partitioned into frames corresponding to pages of said virtual storage, virtual address translation means for translating virtual addresses to real storage addresses, a central processing unit (CPU), a channel and at least one control unit with a plurality of I/O devices connected thereto, said channel connected to interface with said control unit, said CPU, said virtual address translation means and said main storage, said CPU issuing said I/O data transfer commands for said plurality of I/O devices in one sequence and said commanded plurality of I/O devices transferring data in a sequence dependent upon the order in which said commanded plurality of I/O devices are ready to transfer data, each of said plurality of I/O devices having a variable period of time from the time of receiving said I/O data transfer command to the time of being ready for a data transfer, the improvement comprising:

an addressable resolved address register unique to each I/O device connected to said one control unit, said CPU upon issuing an I/O data transfer command for one of said I/O devices provides said channel with a function request and address pointers to a virtual address and to the addressable resolved address register unique to said one of said I/O devices, a pool of addressable resolved address registers shared for use by all of said I/O devices connected to said one control unit, said one control unit upon receiving a command from the first one of said I/O devices being ready to transfer data and requesting loading of multiple I/O resolved address registers provides said channel with a function request and pointers to virtual addresses and to said pool of addressable resolved address registers, control means connected to receive said function requests and said pointers provided to said channel by said CPU and said one control unit for first providing said virtual address translation means with a virtual address and an I/O resolved address register address located by using the pointers provided by said CPU and for commanding said virtual address translation means to translate that virtual address to a real storage address and load the real storage address into said addressable resolved address register unique to said one of said I/O devices and second for providing said address translation means with virtual addresses and I/O resolved address register addresses located by using pointers provided by said control unit and for commanding said virtual address translation means to translate the virtual addresses to real storage addresses and load the real storage addresses in the pool of I/O resolved address registers shared by all of the I/O devices and captured for use by said first one of said I/O devices being ready to transfer data.

3. Control apparatus for controlling virtual storage address translation means in a computer system having a main storage, a central processing unit (CPU), a channel, a shared control unit and a plurality of I/O devices where the virtual address translation means translates virtual storage addresses to real storage address for addressing main storage and where said channel is connected to said CPU to receive input/output (I/O) commands therefrom, connected to said virtual address translation means, connected to said main storage and connected to said shared control unit, said shared control unit being connected to control said plurality of I/O devices, said I/O commands being issued by said CPU in one sequence and said plurality of I/O devices performing said I/O commands in a sequence dependent upon the order in which said commanded I/O devices become ready to perform said I/O commands, each of said plurality of I/O devices having a variable period of time from the time of being commanded to the time of being ready to perform the command, comprising:

interrupt request synchronizing means connected to receive an I/O command from said CPU and an I/O device command from said shared control unit, said I/O device command being generated by said shared control unit in response to the first one of said commanded I/O devices being ready to perform the command and operable to generate a CPU request signal in response to an I/O command from said CPU in the absence of a pending I/O device command and operable to generate a device request signal in response to an I/O device command from said shared control unit in the absence of a simultaneous I/O command from said CPU, a dedicated addressable I/O device resolved address register for each I/O device connected to said shared control unit, a first source of virtual addresses, one for each I/O device connected to said shared control unit, a first source of addresses for addressing said dedicated I/O device resolved address registers, a pool of addressable I/O resolved address registers for shared use by said plurality of I/O devices, a second source of virtual addresses, a second source of addresses for addressing said pool of I/O resolved address registers, control means connected to receive said CPU request signal and said device request signal from said interrupt request synchronizing means and connected to said first and second sources of virtual addresses and responsive to said CPU request signal for providing said virtual address translation means with one of said virtual addresses from said first source of virtual addresses for translation to a real storage address and with an address from said first source of addresses for addressing one of said dedicated I/O resolved address registers for one of said I/O devices connected to said shared control unit into which the translated real storage address is to be loaded and responsive to said device request signal for providing said virtual address translation means with a plurality of virtual storage addresses from said second source of virtual addresses for translation to a plurality of real storage addresses and with a plurality of addresses from said second source of addresses for addressing said pool of I/O resolved address registers into which the plurality of real storage addresses are to be loaded.

4. The control apparatus of claim 3 wherein said interrupt request synchronizing means includes priority means for giving priority to I/O commands from said CPU over I/O device commands from said shared control unit.

5. The control apparatus of claim 3 wherein said interrupt request synchronizing means is resettable to accept an I/O command from said CPU and an I/O device command from said shared control unit, and said control means includes means for generating a reset signal for said interrupt request synchronizing means.

6. The control apparatus of claim 3 wherein said control means provides said virtual address translation means with said plurality of virtual storage addresses from said second source of virtual addresses and said plurality of addresses from said second source of addresses for addressing said pool of I/O resolved address registers one address of each said plurality of addresses at a time and wherein said virtual address translation means provides said control means with a translation complete signal each time a translation has been completed, said translation complete signals being used by said control means for regulating the sending of said one address of each said plurality of addresses to said virtual address translation means.

* * * * *